US009612955B2

(12) United States Patent
Akella et al.

(10) Patent No.: US 9,612,955 B2
(45) Date of Patent: Apr. 4, 2017

(54) HIGH-PERFORMANCE INDEXING FOR DATA-INTENSIVE SYSTEMS

(71) Applicant: Wisconsin Alumni Research Foundation, Madison, WI (US)

(72) Inventors: Srinivasa Akella, Middleton, WI (US);
Ashok Anand, Madison, WI (US);
Aaron Gember, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 253 days.

(21) Appl. No.: 13/737,092

(22) Filed: Jan. 9, 2013

(65) Prior Publication Data

US 2014/0195720 A1    Jul. 10, 2014

(51) Int. Cl.
*G06F 12/00* (2006.01)
*G06F 12/02* (2006.01)
*G06F 17/30* (2006.01)

(52) U.S. Cl.
CPC .... *G06F 12/0246* (2013.01); *G06F 17/30067* (2013.01)

(58) Field of Classification Search
CPC ............. G06F 12/0246; G06F 17/3033; G06F 17/30628
See application file for complete search history.

(56) References Cited

U.S. PATENT DOCUMENTS

| 5,551,027 | A  | * | 8/1996  | Choy   | G06F 17/30321 |
| 2004/0199729 | A1 | * | 10/2004 | Ross   | 711/150 |
| 2010/0199027 | A1 | * | 8/2010  | Pucheral et al. | 711/103 |
| 2010/0332846 | A1 | * | 12/2010 | Bowden et al. | 713/189 |
| 2011/0276781 | A1 | * | 11/2011 | Sengupta | G06F 12/0862 711/216 |
| 2013/0275656 | A1 | * | 10/2013 | Talagala | G06F 12/0246 711/103 |

OTHER PUBLICATIONS

S. Park, E. Seo, J. Shin, S. Maeng and J. Lee "Exploiting Internal Parallelism of Flash-based SSDs", IEEE Computer Architecture Letters, vol. 9, No. 1, Jan.-Jun. 2010.*

(Continued)

*Primary Examiner* — David X Yi
*Assistant Examiner* — Francisco Grullon
(74) *Attorney, Agent, or Firm* — Boyle Fredrickson, S.C.

(57) ABSTRACT

Aspects of the present invention provide high-performance indexing for data-intensive systems in which "slicing" is used to organize indexing data on an SSD such that related entries are located together. Slicing enables combining multiple reads into a single "slice read" of related items, offering high read performance. Small in-memory indexes, such as hash tables, bloom filters or LSH tables, may be used as buffers for insert operations to resolve slow random writes on the SSD. When full, these buffers are written to the SSD. The internal architecture of the SSD may also be leveraged to achieve higher performance via parallelism. Such parallelism may occur at the channel-level, the package-level, the die-level and/or the plane-level. Consequently, memory and compute resources are freed for use by higher layer applications, and better performance may be achieved.

20 Claims, 4 Drawing Sheets

(56) References Cited

OTHER PUBLICATIONS

Anand, Ashok; Kappes, Steven; Akella, Aditya; Nath, Suman "Building Cheap and Large CAMs Using BufferHash", University of Wisconsin-Madison Department of Computer Sciences, 2009.*
Debnath, Biplob, Sudipta Sengupta, and Jin Li. "SkimpyStash: RAM space skimpy key-value store on flash-based storage." Proceedings of the 2011 ACM SIGMOD International Conference on Management of data. ACM, 2011.*
Anand, Ashok, Aaron Gember, and Aditya Akella. "Generic Design Patterns for Tunable and High-Performance SSD-based Indexes.".*
"Cheap and Large CAMs for High Performance Data-Intensive Networked Systems," NSDI 2010, Ashok Anand, Chitra Muthukrishnan, Steven Kappes, Aditya Akella and Suman Nath.
"SILT: A Memory-Efficient, High-Performance Key-Value Store," SOSP, pp. 1-13, 2011, H. Lim, B. Fan, D. G. Andersen, and M. Kaminsky.
"Essential Roles of Exploiting Internal Parallelism of Flash Memory Based Solid State Drives in High-Speed Data Processing," HPCA, pp. 266-277, 2011, F. Chen, R. Lee, and X. Zhang.
"B+-Tree Index Optimization by Exploiting Internal Parallelism of Flash-Based Solid State Drives," PVLDB, 5, 2011, H. Roh, S. Park, S. Kim, M. Shin, and S.-W. Lee.
"Network applications of bloom filters: A survey," Internet Mathematics, A. Broder and M. Mitzenmacher, 2005, 1 (4):485-509.
"Bloomflash: Bloom Filter on Flash-Based Storage," In ICDCS, B. K. Debnath, S. Sengupta, J. Li, D. J. Lilja, and D. H. C. Du., pp. 635-644, 2011.
"Buffered Bloom Filters on Solid State Storage," In ADMS, M. Canim, G. A. Mihaila, B. Bhattacharjee, C. A. Lang, and K. A. Ross, 2010.
"Similarity Search in High Dimensions via Hashing," In Proc. VLDB, 1999, A. Gionis, P. Indyk, and R. Motwani.
"Image Similarity Search with Compact Data Structures," In Proc. CIKM, 2004, Q. Lv, M. Charikar, and K. Li.
"Small Code and Large Image Databases for Recognition," In Proc. CVPR, 2008, A. Torralba, R. Fergus, and Y. Weiss.

* cited by examiner

HIGH-PERFORMANCE INDEXING FOR DATA-INTENSIVE SYSTEMS

TATESMENT REGARDING FEDERALLY SPONSORED RESEARCH OR DEVELOPMENT

This invention was made with government support under 1050170 awarded by the National Science Foundation. The government has certain rights in the invention.

BACKGROUND OF THE INVENTION

The present invention relates to the field of computer systems, and in particular, to high-performance indexing for data-intensive systems.

Data-intensive systems, that is, computer systems that involve substantial amounts of data storage and recovery, are being employed in a wide variety of applications today. Efficient data storage and access normally uses an index structure, such as a key-value index where the address of storage is determined by applying a key (representative of the stored data) to the index to obtain the storage address. Key-value storage systems are employed in cloud-based applications as diverse as ecommerce and business analytics systems and picture stores. Large object stores having key-value indexes are used in a variety of content-based systems such as network de-duplication engines, storage de-duplication, logging systems and content similarity detection engines.

An index may be a simple association list linking pairs of keys and address values like the index of a book. Finding a particular index entry could conceivably be done by ordering the keys (like alphabetizing entries in an index) and searching for key using a search out of them such as a binary search. Preferably, however, to ensure high application performance, index systems often rely on random hashing-based indexes, whose specific design may depend on the particular system. Generally a hash includes keys and values at locations within the index may be determined by applying a hash type function to the key. A benefit of hash indexes is that the hash function immediately directs the user to the necessary key-value pair. For example, wide-area network ("WAN") optimizers, Web caches and video caches may employ large streaming hash tables. De-duplication systems may employ bloom filters to summarize the underlying object stores. Content similarity engines and certain video proxies may employ locality sensitive hash ("LSH") tables. Given the volume of the underlying data, the indexes typically span several tens of Gigabytes, and indexes continue to grow in size. The information in indexes of this type are held both in the key-value pairs of the index but also in the particular topology of the index, that is the location and not simply the order of the keyvalue pairs in the index. Compressing or reordering the entries in a hash type index, for example for space savings, would render the hash index inoperable.

Across such systems, the index may be quite intricate in design. Significant engineering is often devoted to ensure high index performance, particularly with respect to achieving low latency and high throughput, at low costs, particularly with respect to the value of each component used to store the index, as well as the amount of energy they consume. Many state-of-the-art systems advocate using solid-state drive ("SSD") implementations comprised of flash memory to store indexes, given flash memory's superior density, lower cost and energy efficiency over conventional memory, such as DRAM, and superior density, energy efficiency and high random read performance over conventional disk storage. As used herein, SSD will be understood to be non-volatile solid-state memory commonly known as flash memory.

In SSD's, a flash memory page, which may be between 2048 and 4096 bits in size, is typically the smallest unit of read or write operations. Accordingly, reading a single entry in an index stored in the SSD, such as a 16 Byte key-value pair entry, may be as costly as reading a page. In addition, pages are typically organized into blocks with each block spanning 32 or 64 pages. While the performance of random page reads may be comparable to that of sequential page reads, random page writes are typically much slower.

Some ability to provide increased throughput in SSD implementations via leveraging certain parallelisms currently exists. Certain SSD implementations have begun to support native command queuing ("NCQ"), in which multiple I/O operations may execute concurrently.

Some recent research proposals have proposed SSD-based indexes for large key-value stores.

One such proposal, "Cheap and Large CAMs for High Performance Data-Intensive Networked Systems," NSDI 2010, Ashok Anand, Chitra Muthukrishnan, Steven Kappes, Aditya Akella and Suman Nath, referred to as "BufferHash," the contents of which are hereby incorporated by reference, buffers all insertions in the memory, and writes them in a batch on flash. BufferHash maintains in-memory bloom filters to avoid spurious lookups to any batch on flash, and requires less than one page read per lookup on average. However, BufferHash often scans multiple pages in the worst case due to false positives produced by the bloom filters and typically requires greater than 4 bytes/key.

Another proposal, "SILT: A Memory-Efficient, High-Performance Key-Value Store," SOSP, pages 1-13, 2011, H. Lim, B. Fan, D. G. Andersen, and M. Kaminsky, referred to as "SILT," the contents of which are hereby incorporated by reference, comes close to meeting the design requirements outlined above by achieving a low memory footprint (0.7 bytes/entry) and requiring a single page lookup on average. However, SILT uses a much more complex design than other systems in that it employs a plurality of data structures where one is highly optimized for a low memory footprint and others are write-optimized but require more memory. SILT continuously moves data from the write-optimized data structures to the memory-efficient data structure. In doing so, SILT has to continuously sort new data written and merge it with old data, thereby increasing the computation overhead. These background operations also affect the performance of SILT under continuous inserts and lookups. For example, the lookup performance drops by 21% for a 50% lookup-50% insert workload on 64 B key-value pairs. The authors of SILT also acknowledge that sorting becomes performance bottleneck.

The conventional wisdom with respect to index design is that domain and operations-specific SSD optimizations are necessary to meet appropriate cost-performance trade-offs. This poses two problems: (a) SSD implementations having poor flexibility, and (b) SSD implementations having poor generality.

Poor Flexibility:

Index designs often target a specific point in the cost-performance spectrum, severely limiting the range of applications that can use them. This also makes indexes difficult to tune, for example, using extra memory for improved performance. In addition, indexes are often designed to work best under specific workloads. As a result, even minor deviations often cause performance to be quite variable.

Poor Generality:

The design patterns often employed typically apply only to the specific data structure on hand. As a result, it is often difficult to employ different indexes in tandem, such as hash tables for cache lookups alongside LSH tables for content similarity detection over the same underlying content, as they may employ conflicting techniques that result in poor SSD input/output ("I/O") performance.

SUMMARY OF THE INVENTION

The present invention significantly improves the access of index data from flash type memories which have relatively large increments of data access by providing buffer indexes that can accumulate hash type index data for writing to the flash memory. The accumulated index data is arranged on the flash memory so that related data, meaning data related to the same hash, is clustered for more efficient readout. The clustering may be on a flash "page" to be read out together or may take advantage of underlying parallel structure of the flash memory.

Slicing enables combining multiple reads into a single "slice read" of related items, offering high read performance.

Small in-memory indexes, such as hash tables, bloom filters or LSH tables, may be used as buffers for insert operations to resolve the issue of slow random writes on the SSD. When full, these buffers are written to the SSD. Each of these written data structures are called "incarnations." Data is organized on the SSD such that all related entries of different incarnations are located together in a slice, thereby optimizing lookup. The size of a slice may be tuned to control I/O cost.

In addition, the internal architecture of an SSD may be leveraged to achieve higher performance via parallelism. Such parallelism may occur at various levels in the architecture of the SSD, such as the channel-level, the package-level, the die-level and the plane-level. Parallelism benefits may be more significant under particular I/O patterns, and, as such, identifying such patterns and encapsulating regular I/O workloads into them may provide significantly higher performance. Based on the architecture of the SSD, read requests may be appropriately reordered (without violating application semantics) to distribute them uniformly to extract maximal parallelism benefits.

In addition to supporting high performance, the buffering and slicing primitives used in our indexes eliminate the need to maintain complex metadata to assist in index I/O operations. This frees memory and compute resources for use by higher layer applications. Buffering and slicing also facilitate extending the indexes to use multiple SSDs in the same system, offering linear scaling in performance while imposing sub-linear scaling in memory and CPU overhead. State-of-the-art techniques typically cannot be "scaled out" in a similar fashion.

Different indexes may each leverage these optimizations, which may be easier to tune to achieve optimal performance under a given cost constraint, and which may support widely-varying workload patterns and applications with differing resource requirements as compared to past implementations. These optimizations may also offer better input/output operations per second ("IOPS"), cost less and consume lower energy than past implementations.

As described herein, aspects of the present invention provide a method for indexing data in a storage system comprising: (a) receiving a data element for storage in a storage system at a storage address; (b) determining a slot address in an index in a first memory as a function of a key value of the data element for storage; (c) storing the data element for storage linked to the storage address as an index pair at the slot address; and (d) transferring at an interval the index pair from the first memory to an index in a second memory being a flash memory larger in capacity than the first memory to be preferentially combined with previously transferred index pairs having the same slot address.

The method may further comprise: (e) receiving a key value of a data element for retrieval from the storage system; (f) determining a slot address in the index of the second flash memory as a function of a value of the data element for retrieval; (g) reading the preferentially combined index pairs having the same slot address from the second flash memory in a single read cycle; and (h) identifying the data element for retrieval and obtaining a linked storage address. There may be multiple first memories, and step (d) may move the contents of common slot addresses of each of the first memories into a corresponding slot memory of the second memory.

The common slot addresses of the first memories may be less than all slot addresses of the first memories and the predetermined time may be a time when the common slot addresses of the all the first memories have been filled.

The transferred index pairs from the first memories may be combined to be concentrated in a page of the second memory, wherein a page represents a unit of data readout of the second memory.

The method may further comprise reordering a plurality of read requests to allow a plurality of read cycles to occur at the same time within the second flash memory. A plurality of read cycles may occur on channels leading to different flash memory packages within the second flash memory at the same time.

An interval may occur after a predetermined number of index pairs have been stored at slot addresses.

The method may further comprise a plurality of indexes in the first memory, wherein determining the same slot address based on different data elements results in storing the different data elements linked to their respective storage addresses as index pairs in different indexes using the same slot address.

The index may comprise a hash table, and could further comprise a locality-sensitive hash table.

The first memory may be DRAM.

The method may further comprise: (e) determining if a key value for another data element may be in the storage system by using a bloom filter in the first memory; and (f) transferring at an interval the bloom filter from the first memory to a bloom filter in the second memory to be preferentially combined with previously transferred bloom filters using the same hash function.

Another embodiment may provide a method for indexing data in a storage system using flash memory comprising: (a) determining the mapping between a first logical page and a first plurality of memories coupled to a first channel within a flash memory; (a) determining the mapping between a second logical page and a second plurality of memories coupled to a second channel within the flash memory; and (c) reordering a plurality of read requests to the flash memory to allow a plurality of read cycles to occur at the same time within the flash memory.

The plurality of read cycles may occur on channels leading to different flash memory packages within the flash memory at the same time.

The method may further comprise: (d) receiving a data element for storage in a storage system at a storage address; (e) determining a slot address in an index in a first memory smaller in capacity than the flash memory as a function of a value of the data element for storage; (f) storing the data element for storage linked to the storage address as an index pair at the slot address; and (g) transferring at an interval the index pair from the first memory to an index in the flash memory to be preferentially combined with previously transferred index pairs having the same slot address.

An interval may occur after a predetermined number of index pairs have been stored at slot addresses.

The method may further comprise a plurality of indexes in the first memory, wherein determining the same slot address based on different data elements results in storing the different data elements linked to their respective storage addresses as index pairs in different indexes using the same slot address.

The index may be a random hash-based index.

The method may further comprise: (h) receiving a data element for retrieval from the storage system; (i) determining a slot address in the index of the flash memory as a function of a value of the data element for retrieval; (j) reading the preferentially combined index pairs having the same slot address from the flash memory in a single read cycle; and (k) identifying the data element for retrieval and obtaining a linked storage address. A single read cycle may result in reading a flash memory page.

BRIEF DESCRIPTION OF THE DRAWINGS

Embodiments of the invention will now be described, by way of example only, with reference to the accompanying drawings, in which.

DETAILED DESCRIPTION OF THE PREFERRED EMBODIMENT

Figure 1:
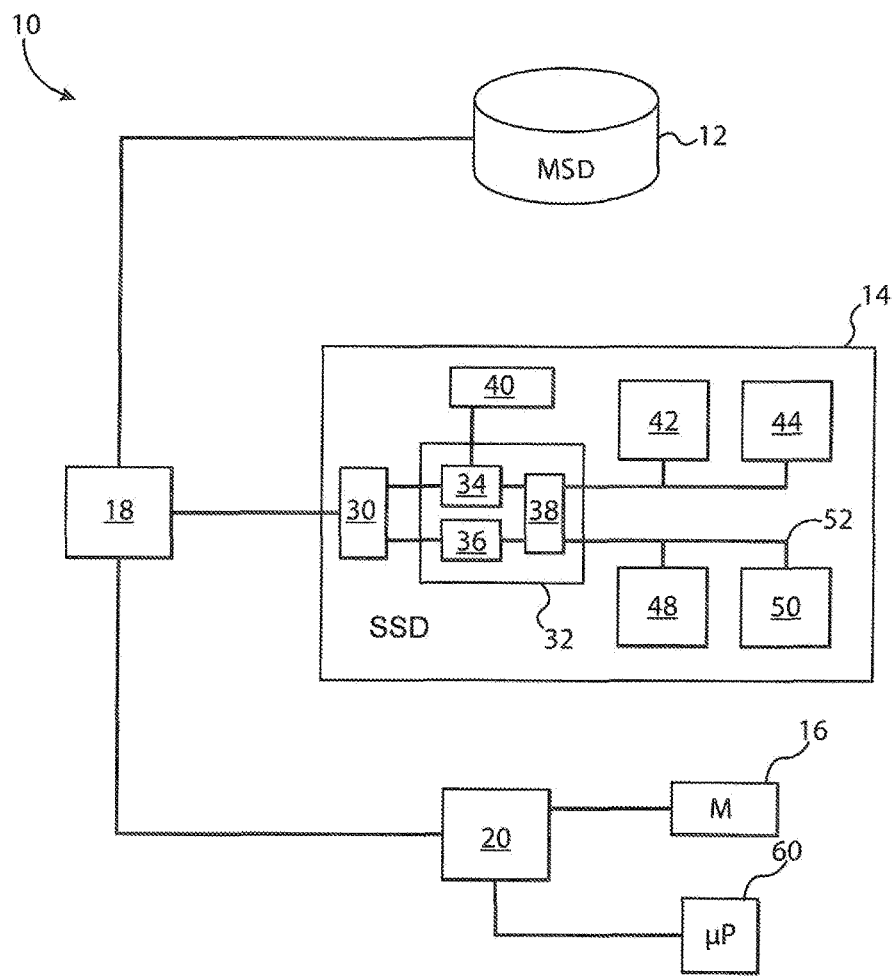
FIG. 1 is a block diagram of a simplified computer data system having a mass storage device, a solid-state drive and a memory in accordance with an embodiment of the present invention.

Referring to FIG. 1, the present invention shall be described in the context of a simplified computer system 10 having a mass storage device ("MSD") 12, a solid-state drive ("SSD") 14 and a memory 16 in accordance with an embodiment of the present invention. The mass storage device 12, which may be, for example, one or more hard disk drives, optical disc drives or magnetic tape drives, holds data which may be measured, for example, in Petabytes or Exabytes, and couples directly or indirectly to a device controller 18, which may be, for example, one or more Serial ATA ("SATA") controllers or similar devices.

The device controller 18 also couples directly or indirectly to the SSD 14, which may be measured in size, for example, in Gigabytes, such as a 128 Gigabyte SSD, and the device controller 18 also couples directly or indirectly to a system controller or chipset 20. The system controller or chipset 20 couples directly or indirectly to one or more system processors 60, which may execute computer readable software fixed in a tangible medium, and to memory 16. The memory 16 may be any conventional computer system memory, and in a preferred embodiment, may be dynamic random access memory ("DRAM"), which may be measured, for example, in Gigabytes.

The SSD 14 comprises interface logic 30, an SSD controller 32, a RAM buffer 40 and a plurality of flash memory packages 42, 44, 48 and 50, or similar non-volatile computer memory which can be electrically erased and reprogrammed. The device controller 18 communicates with interface logic 30, which, in turn, communicates with the SSD controller 32 generally via I/O requests and responses.

The SSD controller 32 comprises an SSD processor 34 or similar logic, a buffer manager 36 and a flash controller 38. The SSD processor 34 couples between the interface logic 30 and the flash controller 38, and the SSD processor 34 also couples to the RAM buffer 40. The buffer manager 36 couples between the interface logic 30 and the flash controller 38. The SSD controller 32 operates to translate logical pages of incoming requests to physical pages, to translate physical pages of outgoing responses to logical pages, and to issues commands to flash memory packages 42, 44, 48 and 50 via the flash controller 38. The flash controller 38 communicates with the plurality of flash memory packages 42, 44, 48 and 50 via a plurality of flash memory channels 46 and 52, in which certain flash memory packages 42 and 44 are coupled via one channel 46, and certain flash memory packages 48 and 50 are coupled via another channel 52. In a preferred embodiment, data will be organized in the SSD 14 such that that multiple entries to be read reside on the same page, thereby reducing the number of page reads.

Figure 2A:
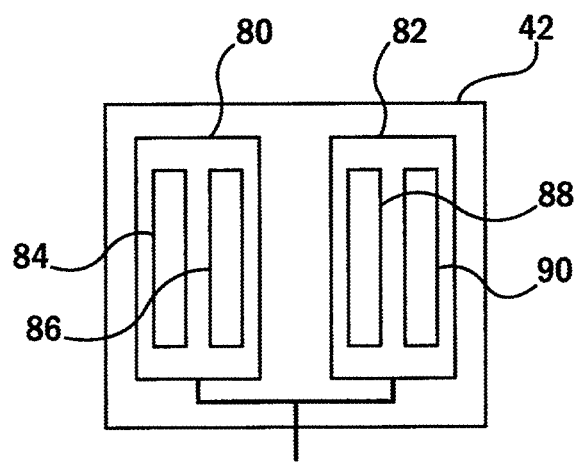
FIG. 2A is a block diagram of a flash memory package.

Referring to FIG. 2A, a block diagram of exemplar flash memory package 42 is shown in accordance with an embodiment of the present invention. Each flash memory package may comprise a plurality of flash memory integrated circuit chips or dies 80 and 82. In turn, each die 80 and 82 may further comprise a plurality of flash memory planes, such as planes 84 and 86 on die 80, and planes 88 and 90 on die 82.

Figure 2B:
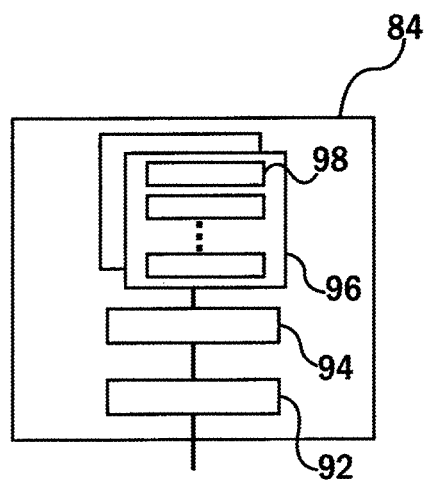
FIG. 2B is a block diagram of a flash memory plane, each in accordance with an embodiment of the present invention.

Referring to FIG. 2B, a block diagram of exemplar flash memory plane 84 is shown in accordance with an embodiment of the present invention. Each flash memory plane may further comprise a cache register 92, coupled in turn to a data register 94, coupled in turn to a plurality of blocks 96. Each block may further comprise a plurality of pages 98 for holding data. The data register 94 may temporarily store a data page during a read or write. A page generally represents a minimum increment of data access, being either the amount of data that must be written to or read from the SSD package in a single read cycle or write cycle.

In operation, for a write command, the SSD controller 32 may first transfer data to the cache register 92, then to the data register 94, via a channel such as channel 46. The data may then be written from the data register 94 to a corresponding physical page. Conversely, for a read command, the data may be first read from the physical page to the data register 94, then to the cache register 92, and then the data may be transferred from the cache register 92 to the controller via a channel such as channel 46. This architecture accordingly provides varying degrees and levels of parallelism. Parallelism, as used herein, means that data can be read or written to simultaneously in different parallel structures.

Each channel can operate in parallel and independently of each other. Thus, the SSD 14 allows channel-level parallelism. Typically, the data transfers from/to the flash memory packages 42 and 44 on the same channel, or the flash memory packages 48 and 50 on the same channel, are serialized. However, data transfers may also be interleaved with other operations, such as reading data from the page 98 to the data register 94 on other packages sharing the same channel. This interleaving allows package-level parallelism. The SSD controller 32 also allocates consecutive logical pages across a gang of different packages on the same channel to provide package-level parallelism. The command issued to a die 80 can be executed independently of others on the same flash memory package 42. This allows die-level parallelism.

Accordingly, multiple operations of the same type, such as read cycles, write cycles and/or erase cycles, can occur simultaneously on different planes in the same die. A two plane command may be used for executing two operations of the same type on two different planes simultaneously. This provides plane-level parallelism. Furthermore, data transfers to and from the physical page can be pipelined for consecutive commands of the same type. This may be achieved using the cache register 92 in the plane. For consecutive write commands, the cache register 92 stores the data temporarily until the previous data is written from the data register 94 to the physical page 98. The cache register 92 may similarly be used for pipelining read commands.

Currently, reading data from the physical page 98 to the data register 94 may typically takes on the order of 25 microseconds (μs). Data transfers on the channel may typically take on the order of 100 μs. Thus, transfer time on the channel is the primary bottleneck for page reads. As such, the throughput of page reads may be significantly improved by leveraging channel-level parallelism.

A first approach to extract the benefits of parallelism may be to simply use multiple threads issuing requests in parallel. By issuing multiple requests in parallel, and increasing the depth of the I/O queue, the overall throughput may be considerably improved.

However, to issue requests in a manner that ideally exploits parallelism, it is important to understand the mapping between pages and channels. Recently, the authors of "Essential Roles of Exploiting Internal Parallelism of Flash Memory Based Solid State Drives in High-Speed Data Processing," HPCA, pages 266-277, 2011, F. Chen, R. Lee, and X. Zhang, the contents of which are hereby incorporated by reference, have devised a method to determine the mapping. A group of consecutive logical pages is striped across different packages on the same channel. The authors discuss a technique to determine the size of the group that gets contiguously allocated within a channel. They refer to this logical unit of data as a "chunk." They show how to determine the chunk size and the number of channels in the SSD. Using this, they also show how to derive the mapping policy. In particular, they discuss techniques for deriving two common mapping policies: (a) write-order mapping, where the $i^{th}$ chunk write is assigned the channel $i$ % N, assuming N is the number of channels, and (b) logical block address ("LBA") based mapping, where the LBA is mapped to a channel based on LBA % N. Using the above, the chunk size and number of channels for the 128 Gigabyte SSD 14 may determined, for example, to be 8 Kilobytes and 32, respectively, following a write-order mapping. With this knowledge of the order of writes to the SSD 14, we can determine the channel corresponding to a page, which enables determining how to reorder and schedule requests to spread them across channels. In addition, package-level parallelism may be achieved by issuing chunk-sized or larger reads.

Based on the above properties of the SSD 14, we identify the following guidelines in designing large hash table-based data structures: (a) avoiding random page writes and issue few large writes, (b) combining multiple reads by arranging data in such a way that the multiple lookups can be confined to a single page or a small number of pages, and (c) intelligent request reordering to allow uniform distribution over channels.

Figure 3:
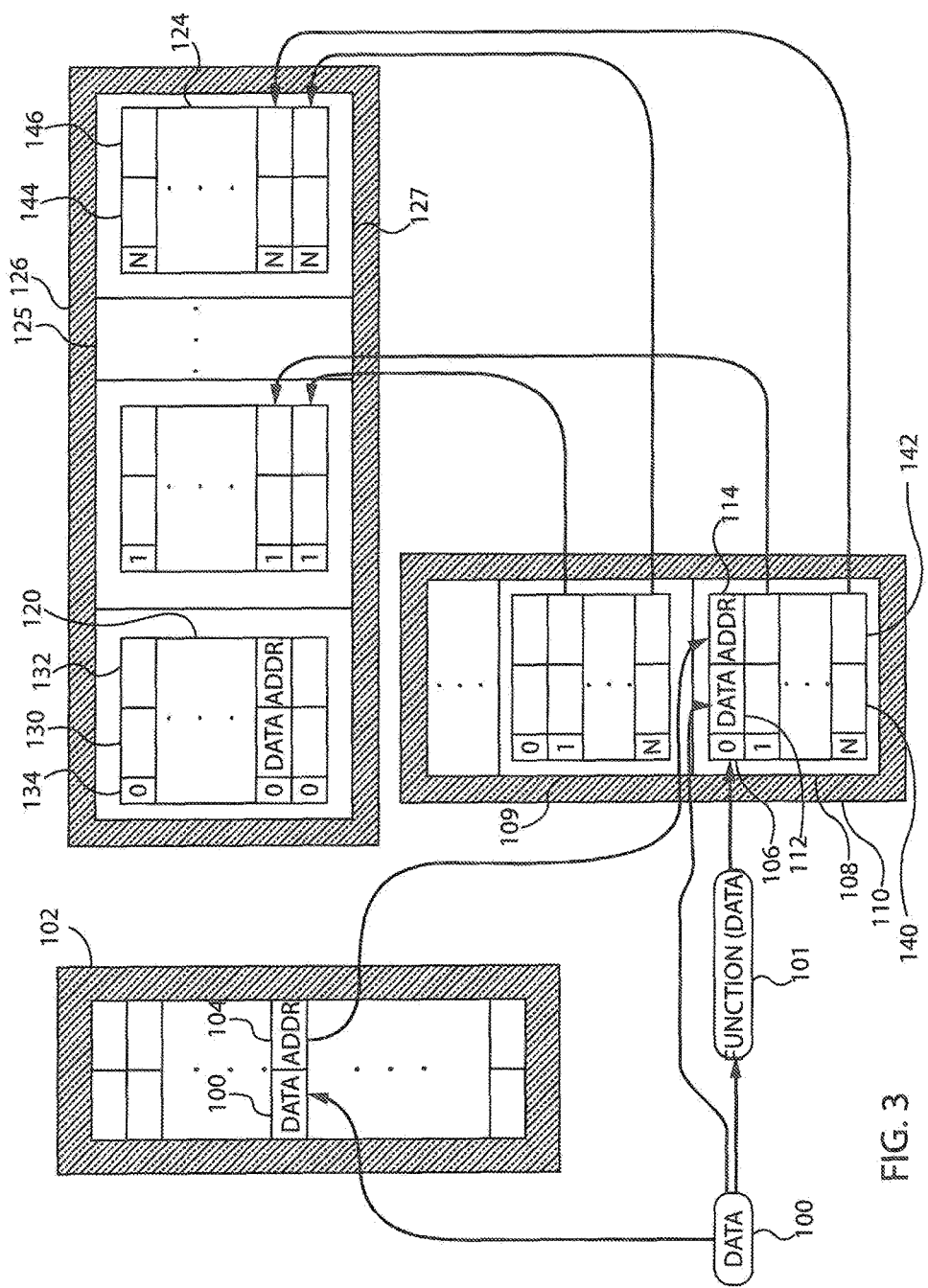
FIG. 3 is a logical diagram illustrating indexing data in a storage system in accordance with an embodiment of the present invention.

Referring now to FIG. 3, a logical diagram illustrating indexing data in a storage system in accordance with an embodiment of the present invention is shown. A data element 100 is received for storage in a storage system 102, which may be a mass storage device, at a storage address 104. A slot address 106, such as slot "0," is determined in an index 108 in a first memory 110 ("in-memory"), which may be DRAM, as a function 101, such as a random hash-based function, of a value of the data element 100 for storage. The data element 100 linked to the storage address 104 is stored as an index pair 112 and 114, respectively, at the slot address 106 in the index 108 in the first memory 110. The index 108, a collection of index pairs at various slot addresses in the first memory 110, may be referred to as an "incarnation." An alternative embodiment may provide a plurality of incarnations in the first memory 110, such as an additional index 109 in the first memory 110.

At intervals, such as when the index 108 is full, which may be determined, for example, by reaching a predetermined number of slot addresses for an incarnation, the index pairs, such as index pair 112 and 114, are transferred from the first memory 110 to an index 125, a portion of which may be referred to as a "slice table," in a second flash memory 126 larger in capacity than the first memory 110, such as an SSD, to be preferentially combined with previously transferred index pairs. For example index pair 112 and 114 having the slot address "0" may be transferred to the slice table 125 in the second flash memory 126 at a particular "slice" or index 120 with other index pairs also having the same slot address "0," such as index pair 130 and 132. The slice table 125 may exist alongside additional slice tables, such as index 127. Similarly, index pair 140 and 142 having the slot address "N" may be transferred to the slice table 125 in the second flash memory 126 at a particular "slice" 124 in the second flash memory 126 with other index pairs also having the same slot address "N," such as index pair 144 and 146. In other words, index pairs at each slot address in an incarnation are transferred to slices where they are grouped with previously transferred index pairs according to having the same slot address. For "N" slot addresses in the index 108 in the first memory 110, there may be "N" slices in the index or slice table 125 in the second flash memory 126. For such embodiments using hash tables, this may be referred to as "slice hash." Such intervals need not occur at fixed or predetermined times.

In a preferred embodiment, the size of a slice can be limited to a page, and thus it would require only one page read. For example, for a 16B key-value pair, one slice can contain as many as 128 incarnations.

Additional incarnations may be created in the first memory 110, such as the additional index 109. For example, determining the slot address for distinctly different data values could result in determining the same slot address. In this case, the entries may be stored in different incarnations using the same slot address. In transferring incarnations to the slice table, the most recently created incarnation may be transferred as the latest entries in the corresponding slice table—with the oldest entries in the slice table evicted as may be required, such as due to space limitations—a in a FIFO order.

A slot address 106, such as slot "0," is determined in an index 108 in a first memory 110 ("in-memory"), which may be DRAM, as a function 101, such as a random hash-based function, of a value of the data element 100 for storage.

The data element 100 may also be received for retrieval from the storage system. In this case, a slot address 134 is determined in the index or slice table 125 of the second flash memory 126 as a function of a value of the data element 100 for retrieval. The preferentially combined index pairs having the same slot address are read from the second flash memory 126 in a single read cycle, the data element for retrieval is identified and a linked storage address is obtained.

For inserts/writes, we insert a key into the in-memory index 108. If the in-memory index 108 becomes full, we first read the corresponding slice table 125 from the second flash memory 126. We then replace the entries for the corresponding incarnation for each slot or slice with the entry of the in-memory index 108. Then, we write back the modified slice table 125 to the second flash memory 126. The in-memory index 108 is cleared, and the current incarnation count is incremented. Subsequent insertions happen in a similar way. Once all incarnations are exhausted on the second flash memory 126, the incarnation count is reset to zero. Thus, this scheme supports a default FIFO eviction policy.

For updates, if the key is in the in-memory index 108, the in-memory index 108 is updated with the new value. Alternatively, if the key lies on the second flash memory 126, directly updating the corresponding key-value pair on the second flash memory 126 would cause random page writes and affect performance. Instead, the new key-value pair is inserted into the in-memory index 108.

For lookups/reads, the key is first looked up in the in-memory index 108. If not found, the corresponding slice table is looked up on the second flash memory 126 and the slice is read from the SSD. The entries for all incarnations may be scanned in the order of the latest to the oldest incarnation. This ensures that the lookup does not return stale values.

Partitioning Slice Hash:

Based on the first few bits of keys, the in-memory index 108 may be partitioned into multiple small in-memory indexes, and, for each in-memory index 108, a corresponding small-sized slice table on flash may be maintained. Thus, if an in-memory partition becomes full, only the corresponding slice table on the SSD requires updating. In this way, the size of slice tables on flash and the worst case insertion latency may be controlled.

Leveraging Available Memory:

If additional memory is available, spurious lookups may be reduced using in-memory bloom filters. All lookups may be first checked in these bloom filters. If the bloom filters indicate that a key is present in the second flash memory 126, only then is an SSD lookup issued. Further, memory may be used opportunistically. For example, bloom filters can be maintained for only some partitions, for example, those that are accessed frequently. This gives the ability to adapt to memory needs, while ensuring that in the absence of such additional memory application performance targets are still met.

Adding Concurrency

Figure 4:
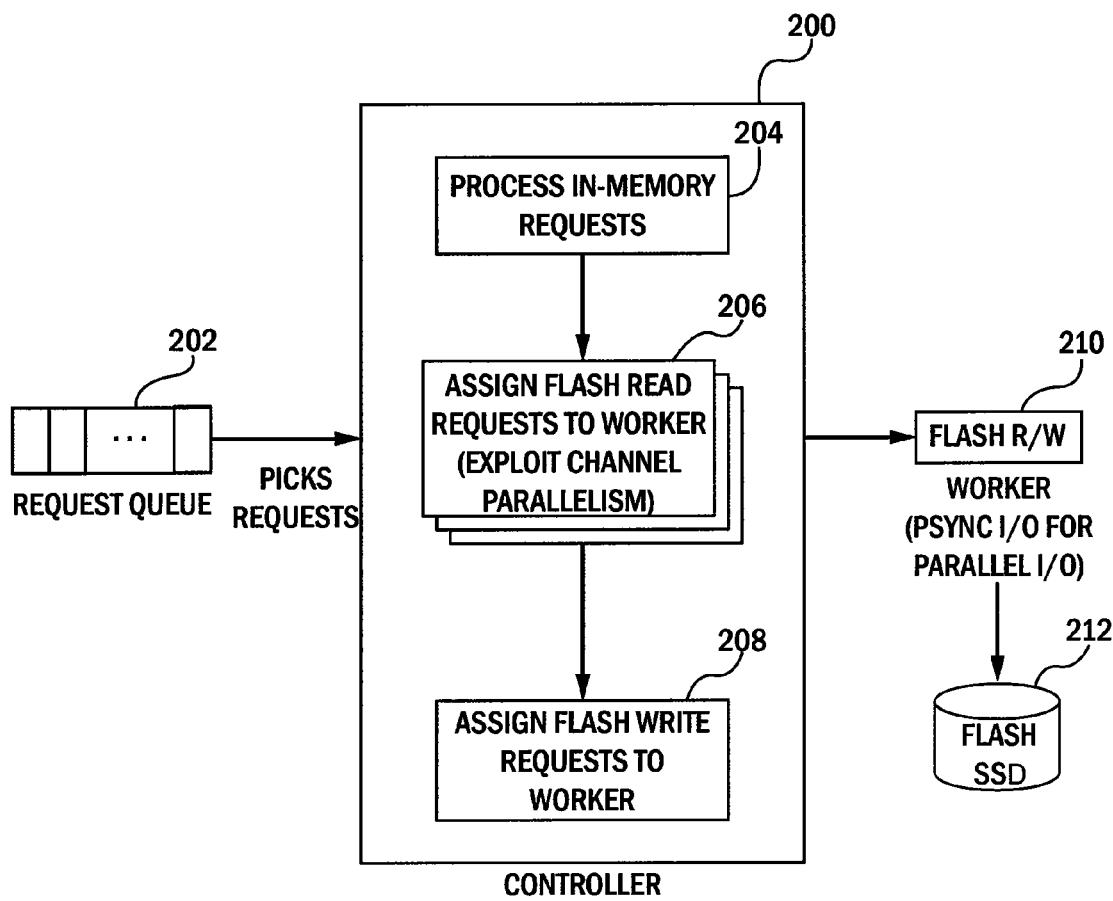
FIG. 4 is a logical diagram illustrating adding concurrency to slice hash in accordance with an embodiment of the present invention.

Referring now to FIG. 4, a diagram illustrating adding concurrency to slice hash is shown in accordance with an embodiment of the present invention. In order to leverage the parallelism inherent to an SSD, I/O requests should be issued in parallel. Instead of using a multithreaded programming model, multiple concurrent I/O requests may be issued to the SSD, such as that described in "B+-Tree Index Optimization by Exploiting Internal Parallelism of Flash-Based Solid State Drives," PVLDB, 5, 2011, H. Roh, S. Park, S. Kim, M. Shin, and S.-W. Lee, referred to as "psync I/O," the contents of which are hereby incorporated by reference. Internally, psync I/O uses multiple asynchronous I/O calls, and waits until all I/O's are completed.

A controller 200 may processes requests originating from request queue 202, which may comprise insert, update and/or lookup operations, in batches. The controller 200 first processes all requests that can be instantly served in memory. Then the controller 200 processes lookup requests which need reading from the SSD. To leverage channel-level parallelism maximally, the controller should pick requests that go to different channels. Based on determining a mapping between pages and channels as discussed above, a channel-estimator may be developed to estimate the mapping between read requests and channels. Using these estimates, a set of K requests, with K corresponding to the size of the SSD's NCQ, such that the number of requests picked for any channel is minimized. While it is desirable to use as much concurrency as the NCQ can provide, it is important to optimally exploit channel parallelism.

The algorithm underlying request selection works as follows. In block 204, a "depth" for each channel is maintained, which estimates the number of selected requests for a channel. Multiple passes over the request queue are taken until K requests are selected. In each pass, requests that would increase the depth of any channel by at most 1 are selected. In this manner, the set of read requests to be issued are found.

In block 206, the controller then asks a worker 210 to process these read requests in parallel, such as using psync I/O. While the worker 210 is waiting for flash reads to complete, the controller also determines the next batch of read requests to be issued to the worker 210. After the flash page reads are complete, the worker 210 searches the entries of all incarnations on the corresponding flash page for the given key.

After processing lookups, in block 208 the controller assigns SSD insert requests to the worker 210. These occur when an in-memory index is full and needs to be flushed onto the Flash SSD 212. The worker 210 processes these SSD insert requests, and accordingly reads/writes slice tables from the SSD 212.

Note that there may be consistency issues with reordering reads and writes. The controller handles such corner cases explicitly.

Building on the technique used in "Essential Roles of Exploiting Internal Parallelism of Flash Memory Based Solid State Drives in High-Speed Data Processing," write-order mapping to predict the channel corresponding to a request may be determined. As discussed above, data chunk writes alternate across channels. In other words, the first write goes to the first channel, the second write goes to the second channel, and so forth. Knowing this write order can help determine the channel for any chunk. One approach is to maintain an index that keeps track of the assignment of each chunk to a channel; whenever a chunk is written, estimate its channel as 1% N for the $i^{th}$ write and update the index. For example, the size of the index may be estimated around 160 Megabytes for 4 Kilobyte data chunk in a 128 Gigabyte SSD, and assuming 4 bytes for the chunk identifier, and 1 byte for the channel in the index.

We consider an approach that does not require any index management. We configure the size of the slice table to be a multiple of N×ChunkSize, where N is the number of channels. This simplifies determination of the channel. Whenever a slice table is written to the SSD, there will be N chunk writes, and the $i^{th}$ chunk write would go to the $i^{th}$ channel. The subsequent slice table write would also follow the same pattern; after the $N^{th}$ channel, the first chunk write would go to the first channel, the second chunk write would go to the second channel, and so on. In other words, once we determine the relative chunk identifier (first, or second, or Nth) for an offset in the slice table, we can determine the channel. The relative chunk identifier can be determined as the offset modulo chunk size.

Due to its simplistic design and low resource footprint, slice hash can easily leverage multiple SSDs attached to a single machine. Slice hash can benefit from multiple SSD's in two ways: (a) higher parallelism (the key space is partitioned across multiple SSDs; one controller-worker combination for each SSD is maintained; lookup/insert requests may be distributed across multiple SSDs; and each controller may handle requests in parallel), and (b) lower memory footprint (for each in-memory index, one slice table per SSD is maintained). For lookups, concurrent lookup requests to all SSDs may be issued, in effect requiring an average latency of one page lookup. For insertions, insertions into a slice table on one SSD are made, and as it becomes full, insertions move to next SSD. Once all SSD's slice tables are full, insertions return to the slice table on the first SSD. This may reduce the memory footprint, while maintaining the same latency and throughput. Other systems, such as Buffer-Hash and SILT, do not support such scaling out and ease of tuning.

Leveraging Multiple SSD's:

In practice, depending on the specific requirements of throughput and memory footprint, a combination of the above two techniques may be used to tune the system accordingly. Thus, slice hash allows us to leverage multiple SSD's in many different ways.

Latency and the memory overhead of slice hash may be analyzed accordingly. Table 2 provides a summary of notations relevant for such analysis.

TABLE 2

| Symbol | Meaning |
| --- | --- |
| M | Total memory size |
| N | Number of SSDs |
| n | number of partitions |
| H | Size of a single hashtable (=M/n) |
| s | Size taken by a hash entry |
| u | Utilization of tje hashtable |
| $s_{eff}$ | Effective average space taken by a hash entry (=s/u) |
| k | Number of incarnations (=F/M) |
| F | Total flash size |
| S | Size of slicetable (=H × k) |
| P | Size of a flash page/sector |
| B | Size of a flash block |
| $r_p$ | Page read latency |
| $r_b$ | Block read latency |
| $w_b$ | Block write latency |

The memory overhead per entry may be estimated. The total number of entries in an in memory hash table is $H/s_{eff}$ where H is the size of a single hash table and $s_{eff}$ is the effective average space taken by a hash entry (actual size (s)/utilization (u)). The total number of entries overall in a slice hash for a given size F of flash is:

$$\left(\frac{F+M}{H}\right) \times \frac{H}{s_{eff}} = \frac{F+M}{s_{eff}}$$

Here, M is the total memory size. Hence, the memory overhead per entry is M/ #entries, in other words, $$\frac{M}{F+M} \times s_{eff},$$

or $$\frac{1}{k+1} \times s_{eff}$$

where k is the number of incarnations.

For s=16 Bytes (key 8 bytes, value 8 bytes), u=80%, M=1 Gigabyte, and F=32 Gigabytes, the memory overhead per entry is 0.6 bytes/entry. In contrast, SILT and BufferHash have memory overheads of 0.7 bytes/entry and 4 bytes/entry, respectively.

By using N SSD's, we can reduce the memory overhead to even lower, $$\frac{1}{k \times N + 1} \times s_{eff}$$

using the technique outlined above. For the above configuration with N=4 SSD's, this amounts to 0.15 bytes/entry.

The average time taken for insert operations may be estimated. The time taken to read a slice table and then write it back is first calculated. This is given by $$\left(\frac{S}{B} \times r_b + \frac{S}{B} \times w_b\right)$$

where S is the size of the slice table, B is the size of a flash block, and $r_b$ and $w_b$ are the read and write latencies per block, respectively. This happens after $H/s_{eff}$ entries are inserted to the hash table; all insertions up to this point are made in memory. Hence, the average insertion cost is $$\left(\frac{S}{B} \times r_b + \frac{S}{B} \times w_b\right) \times \frac{s_{eff}}{H}$$

Replacing S by H*k, we get $$\frac{(r_b + w_b) \times s_{eff} \times k}{B},$$

which is independent of the size of the hash table.

For typical block read latency of 0.31 ms, a blocked write latency of 0.83 nearly seconds, s=16 Bytes, M=1 Gigabyte, F=32 Gigabytes, and u=80%, the average insertion cost is approximately 5.7 microseconds (μs), and thus still small. In contrast BufferHash has an average insertion latency of approximately 0.2 μs.

Similarly, the worst-case insertion cost of slice hash is (0.31+083)×S/B milliseconds (ms). By configuring S to be the same size as B, we can control the worst-case insertion cost of the (0.31+083)=1.14 ms, slightly higher than the worst-case insertion cost (0.83 ms) of BufferHash.

We consider a cuckoo hashing based hash table implementation with two hash functions. Suppose the success probability of the first lookup is p. For each lookup, a corresponding slice is read. We configure H, the size of an in-memory hash table, such that size of a slice is not more than a page. With this, the average lookup cost is $r_p+(1-p)\times r_p$ or $(2-p)\times r_p$ assuming that almost all of the lookups go to SSD and only few requests are served by in-memory hash tables. For p=0.9, $r_p$=0.15 ms, the average lookup cost is 0.16 ms. SILT and BufferHash, both have similar average lookup cost.

The worst case condition may occur upon reading both pages corresponding to the two hash functions. The worst case lookup latency is $2\times r_p$. For $r_p$=0.15 ms, this cost is 0.3 ms. In contrast, BufferHash may have very high worst case lookup latency; in the worst case, it may have to scan all incarnations. For k=32, this cost would be 4.8 ms.

The ratio of the number of insertions to the number of block writes to the SSD may be estimated as the ratio $r_{write}$. A hash table becomes full after every $H/s_{\mathit{eff}}$ inserts, after which the corresponding slice table on flash is modified. The number of blocks occupied by a slice table is S/B or k× H/B. Thus $$r_{write} = \frac{H}{s_{\mathit{eff}}} \times \frac{B}{k \times H} = \frac{B}{k \times s_{\mathit{eff}}}$$

Thus, by increasing the number of incarnations k, the frequency of writes to SSD (which is inversely proportional to $r_{write}$) also increases. This in turn affects the overall performance.

Slice hash increases the number of writes to the SSD which may impact its overall lifetime. The lifetime of an SSD may be estimated. For a given insert rate of R, the number of block writes to the SSD per second is $R/r_{writes}$ or the average time interval between block writes is $r_{writes}/R$. The SSD may supports E erase cycles. Assuming the wear leveling scheme for flash is perfect, then the lifetime (T) of the SSD could be approximately estimated as number of blocks, F/B times erase cycles E, times average time interval between block writes, $r_{wrires}/R$, in other words, $$T = \frac{F \times E \times r_{writes}}{R \times B}.$$

Bloom Filters:

Bloom filters, including as described in "Network applications of bloom filters: A survey," Internet Mathematics, A. Broder and M. Mitzenmacher, 2005, 1(4):485-509; "Bloomflash: Bloom Filter on Flash-Based Storage," In ICDCS, B. K. Debnath, S. Sengupta, J. Li, D. J. Lilja, and D. H. C. Du., pages 635-644, 2011; and "Buffered Bloom Filters on Solid State Storage," In ADMS, M. Canim, G. A. Mihaila, B. Bhattacharjee, C. A. Lang, and K. A. Ross, 2010, the contents of each of which are hereby incorporated by reference are traditionally used as in-memory data structures.

Some recent studies have observed, with storage costs falling and data volumes growing into the peta- and exabytes, space requirements for Bloom filters constructed over such datasets are also growing commensurately. In limited memory environments, there is a need to maintain large Bloom filters on secondary storage. The techniques described above may be applied for supporting Bloom filters on flash storage efficiently, referred to as "slice bloom."

Similar to slice hash, several in-memory small Bloom filters and corresponding slice filters may be provided on flash, similar to slice tables in slice hash described above with respect to FIG. 3. The in-memory Bloom filters are written to flash as incarnations. Each slot in a slice filter contains the bits from all incarnations taken together.

In traditional Bloom filters, a key lookup requires computing multiple hash functions and reading entries corresponding to the bit positions computed by the hash functions. Here, the corresponding in-memory Bloom filter partition may be first looked up, and then the corresponding slice filter on the flash storage for each hash function may be looked up. The number of hash functions would determine the number of page lookups, which could limit the throughput.

Since flash storage is less expensive than conventional memory, such as DRAM, more space per entry on flash may be used, in other words, a larger m/n where m and n are the Bloom filter size and number of unique elements, respectively, and reduce the number of hash functions (k) while maintaining a similar overall false positive rate. For example, for a target false positive rate of 0.0008, instead of using m/n=15 and k=8, we can use m/n=32 and k=3. By reducing k, the number of page lookups may be reduced and performance improved.

Locality Sensitive Hash Tables:

Locality sensitive hashing, including as described in "Similarity Search in High Dimensions via Hashing," In Proc. VLDB, 1999, A. Gionis, P. Indyk, and R. Motwani; "Image Similarity Search with Compact Data Structures," In Proc. CIKM, 2004, Q. Lv, M. Charikar, and K. Li; and "Small Code and Large Image Databases for Recognition," In Proc. CVPR, 2008, A. Torralba, R. Fergus, and Y. Weiss, the contents of each of which are hereby incorporated by reference, is a technique used in the multimedia community for finding duplicate videos and images at large scale. These systems use multiple hash tables. For each key, the corresponding bucket in each hash table is looked up. Then, all entries in the buckets are compared with the key to find the nearest neighbor based on a certain metric, for example, the Hamming distance or an L2 norm. Once again, the techniques discussed above may be applied to build large LSH hash tables efficiently on flash storage, referred to as "slice LSH."

Each of the LSH hash tables is designed as slice hash; when a query comes, it goes to all slice hash instances. We further optimize for LSH to exploit SSD-intrinsic parallelism. When we write in-memory LSH hash table partitions to flash, they are arranged on the flash such that each LSH slice table partition belongs to one channel and the hash tables are uniformly distributed over multiple channels. This ensures that multiple hash table lookups would be uniformly distributed over multiple channels, and the intrinsic parallelism of flash SSDs is maximally leveraged.

One or more specific embodiments of the present invention have been described above. It is specifically intended that the present invention not be limited to the embodiments and/or illustrations contained herein, but include modified forms of those embodiments including portions of the embodiments and combinations of elements of different embodiments as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the present invention unless explicitly indicated as being "critical" or "essential."

Certain terminology is used herein for purposes of reference only, and thus is not intended to be limiting. For example, terms such as "upper," "lower," "above," and "below" refer to directions in the drawings to which reference is made. Terms such as "front," "back," "rear," "bottom," "side," "left" and "right" describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first," "second" and other such numerical terms referring to structures do not imply a sequence or order unless clearly indicated by the context.

When introducing elements or features of the present disclosure and the exemplary embodiments, the articles "a," "an," "the" and "said" are intended to mean that there are one or more of such elements or features. The terms "comprising," "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a microprocessor" and "a processor" or "the microprocessor" and "the processor" can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

All of the publications described herein including patents and non-patent publications are hereby incorporated herein by reference in their entireties.

What is claimed is:

1. A method for indexing data in a storage system having first and second memories and, a mass storage device larger than the first or second memories, the method comprising:
   (a) storing a data element in the mass storage device at a storage address;
   (b) determining a slot address in an index in the first memory as a function of the data, element;
   (c) storing a key representative of the data element and the storage address as an index pair at the slot address in the first memory; and
   (d) transferring at an interval the index pair from the first memory to an index in the second memory being larger in capacity than the first memory, the second memory being organized in a plurality of pages in which a page is the smallest unit for a read operation,
   wherein the index pair is transferred with at least one other index pair as transferred index pairs having the same slot address, and
   (e) storing the transferred index pairs in the second memory on a same page with a previously transferred index pair determined to have the same slot address,
   wherein slot addresses of index pairs in the first memory are analyzed for having a same slot address with index pairs having a same slot address being selectively accumulated in the second memory on a same page.

2. The method of claim 1, further comprising:
   (e) receiving a key value of a data element for retrieval from the mass storage device;
   (f) determining a slot address in the index of the second memory as a function of as value of the data element for retrieval;
   (g) reading the preferentially combined index pairs having the same slot address from the second memory in a single read cycle; and
   (h) identifying the data element for retrieval and obtaining a linked storage address.

3. The method of claim 1, further comprising providing multiple indexes, and wherein step (d) moves the contents of common slot addresses of each of the indexes into a corresponding slot address of the second memory.

4. The method of claim 3, wherein the number of indexes is less than the number of slot addresses of the indexes.

5. The method of claim 4, wherein a page is between 2048 and 4096 bits in size.

6. The method of claim 2, further comprising reordering a plurality of read requests to allow a plurality of read cycles to occur at the same time within the second memory.

7. The method of claim 6, wherein a plurality of read cycles occurs on channels leading to different flash memory packages within the second memory at the same time.

8. The method of claim 1, wherein an interval occurs after a predetermined number of index pairs have been stored at slot addresses.

9. The method of claim 1, further comprising providing a plurality of indexes in the first memory, wherein determining the same slot address based on different data elements results in storing the different data elements linked to their respective storage addresses as index pairs in different indexes using the same slot address.

10. The method of claim 9, wherein each index comprises a hash table.

11. The method of claim 10, wherein each hash table is a locality sensitive hash table.

12. The method of claim 1, further comprising:
   (e) determining a key representative of another data element using a bloom filter in the first memory; and
   (f) transferring at an interval the bloom filter from the first memory to a bloom filter in the second memory to be preferentially combined with previously transferred bloom filters using the same hash function.

13. The method of claim 1, wherein the first memory is DRAM.

14. A method for indexing data in a storage system having a flash memory. a DRAM and a mass storage device larger than the flash memory or the DRAM, the method comprising:

(a) determining a mapping between a first logical page and a first channel within the flash memory;
(b) determining a mapping between a second logical page and a second channel within the flash memory;
(c) storing first and second data elements in the mass storage device at first and second storage addresses, respectively;
(d) determining first and second slot addresses in an index in the DRAM as functions of the first and second data elements for storage, respectively;
(e) storing first and second keys representative of the first and second data elements and the first and second storage addresses as first and second index pairs at the first and second slot addresses, respectively, in the DRAM; and
(f) transferring at an interval the first and second index pairs from the DRAM to an index in the flash memory, the flash memory being organized in a plurality of pages in which a page is the smallest unit for a read operation,
wherein the first index pair is transferred with at least one other index pair having the first slot address, and the second index pair is transferred with at least one other index pair having the second slot address, and
(e) storing the transferred index pairs in the index of the flash memory on first and second logical pages with previously transferred index pairs determined to have the same slot addresses, so that the first and second logical pages each store transferred index pairs having same slot addresses,
wherein slot addresses of index pairs in the first memory arc analyzed for having same slot addresses with index pairs having same slot addresses being selectively accumulated in the second memory on same pages, and
wherein the first and second index pairs are written to the first and second logical pages, respectively, to occur at the same time within the flash memory.

15. The method of claim 14, wherein the first and second channels lead to different flash memory packages within the flash memory.

16. The method of claim 14, wherein an interval occurs after a predetermined number of index pairs have been stored at slot addresses.

17. The method of claim 14, further comprising providing a plurality of indexes in the DRAM, wherein determining the same slot addresses based on different data elements results in storing the different data elements linked to their respective storage addresses as index pairs in different indexes using the same slot address.

18. The method of claim 17, wherein each index is a random hash-based index.

19. The method of claim 14, further comprising:
(g) receiving a third data element for retrieval from the mass storage device;
(h) determining a slot address in the index of the flash memory as a function of the third data element for retrieval;
(i) reading the preferentially combined index pairs having the same slot address from the flash in memory; and
(j) identifying the third data element for retrieval to obtain a linked storage address.

20. The method of claim 1, wherein the second memory is a flash memory.

* * * * *